(12) United States Patent
Joye et al.

(10) Patent No.: US 11,100,222 B2
(45) Date of Patent: Aug. 24, 2021

(54) METHOD FOR HARDENING A MACHINE LEARNING MODEL AGAINST EXTRACTION

(71) Applicant: NXP B.V., Eindhoven (NL)

(72) Inventors: Marc Joye, Palo Alto, CA (US); Ahmed Ullah Qureshi, Los Altos, CA (US)

(73) Assignee: NXP B.V., Eindhoven (NL)

( * ) Notice: Subject to any disclaimer, the term of this patent is extended or adjusted under 35 U.S.C. 154(b) by 436 days.

(21) Appl. No.: 16/180,144

(22) Filed: Nov. 5, 2018

(65) Prior Publication Data
US 2020/0143045 A1    May 7, 2020

(51) Int. Cl.
*G06F 21/55* (2013.01)
*G06N 3/02* (2006.01)
*G06F 21/75* (2013.01)
*G06N 20/00* (2019.01)

(52) U.S. Cl.
CPC ............ *G06F 21/554* (2013.01); *G06F 21/75* (2013.01); *G06N 3/02* (2013.01); *G06N 20/00* (2019.01)

(58) Field of Classification Search
CPC .... G06F 21/50–568; G06F 21/75; G06N 3/02
See application file for complete search history.

(56) References Cited

U.S. PATENT DOCUMENTS

| | | | | |
|---|---|---|---|---|
| 2005/0147246 A1* | 7/2005 | Agrawal | ............ | G06F 21/6227 380/44 |
| 2010/0049907 A1* | 2/2010 | Kitsunai | ............... | G06F 3/0619 711/103 |
| 2018/0330379 A1* | 11/2018 | Zoldi | .................... | G06N 3/0454 |
| 2019/0050564 A1* | 2/2019 | Pogorelik | ............. | G06F 21/554 |
| 2019/0362072 A1* | 11/2019 | Kesarwani | .............. | G06F 21/56 |
| 2020/0019699 A1* | 1/2020 | Araujo | ..................... | G06F 21/57 |

FOREIGN PATENT DOCUMENTS

WO    WO-2020040777 A1 *    2/2020    ............. G06N 20/20

OTHER PUBLICATIONS

Chakraborty A, Alam M, Dey V, Chattopadhyay A, Mukhopadhyay D. Adversarial attacks and defences: A survey. arXiv preprint arXiv:1810.00069. Sep. 28, 2018. (Year: 2018).*

(Continued)

*Primary Examiner* — Madhuri R Herzog
(74) *Attorney, Agent, or Firm* — Daniel D. Hill

(57) ABSTRACT

A method is provided for protecting a trained machine learning model that provides prediction results with confidence levels. The confidence level is a measure of the likelihood that a prediction is correct. The method includes determining if a query input to the model is an attempted attack on the model. If the query is determined to be an attempted attack, a first prediction result having a highest confidence level is swapped with a second prediction result having a relatively lower confidence level so that the first and second prediction results and confidence levels are re-paired. Then, the second prediction result is output from the model with the highest confidence level. By swapping the confidence levels and outputting the prediction results with the swapped confidence levels, the machine learning model is more difficult for an attacker to extract.

17 Claims, 3 Drawing Sheets

(56) References Cited

OTHER PUBLICATIONS

Barreno M, Nelson B, Joseph AD, Tygar JD. The security of machine learning. Machine Learning. Nov. 2010;81 (2): 121-48. (Year: 2010).*

Ateniese, Giuseppe, et al.; "Hacking Smart Machines With Smarter Ones: How To Extract Meaningful Data From Machine Learning Classifiers;" International Journal of Security and Networks, 10(3):137-150, 2015. doi:10.1504/IJSN.2015.071829.

Correia-Silva, Jacson Rodrigues, et al.; "Copycat CNN: Stealing Knowledge By Persuading Confession With Random Non-Labeled Data;" 2018 International Joint Conference on Neural Networks (IJCNN), Rio de Janeiro, Brazil, Jul. 8-13, 2018.

U.S. Appl. No. 16/040,992; Inventor Wilhelmus Petrus Adrianus Johannus Michiels, et al.; "Method for Making a Machine Learning Model More Difficult to Copy;" filed Jul. 20, 2018.

Fredrikson, Matt, et al.; "Model Inversion Attacks That Exploit Confidence Information And Basic Countermeasures;" 22nd ACM SIGSAC Conference on Computer and Communications Security; pp. 1322-1333, Denver, CO, USA, Oct. 12-16, 2015. ACM. doi:10.1145/2810103.2813677.

Juuti, Mika, et al.; "PRADA: Protecting Against DNN Model Stealing Attacks;" eprint arXiv:1805.02628, May 2018. URL https://arxiv.org/abs/1805.02628.

Kesarwani, Manish, et al.; "Model Extraction Warning In MLaaS Paradigm;" eprint arXiv:1711.07221, Nov. 2017. URL https://arxiv.org/abs/1711.07221.

McDaniel, Patrick, et al.; "Machine Learning In Adversarial Settings;" IEEE Security & Privacy Magazine, 14 (3):68-72, May/Jun. 2016. doi:10.1109/MSP.2016.51.

Oh, Seong Joon, et al.; "Towards Reverse Engineering Black-Box Neural Networks;" 6th International Conference on Learning Representations (ICLR); Vancouver, Canada, Apr. 30-May 3, 2018. Poster Session.

Papernot, Nicolas, et al.; "Practical Black-Box Attacks Against Machine Learning;" 2017 ACM on Asia Conference on Computer and Communications Security (AsiaCCS), pp. 506-519, Abu Dhabi, United Arab Emirates, Apr. 2-6, 2017. ACM. doi:10.1145/3052973.3053009.

Schölkopf, Bernhard, et al.; "Estimating The Support Of A High-Dimensional Distribution;" Neural Computation, 13(7):1443-1471, Jul. 2001.

Shi, Yi, et al.; "How To Steal A Machine Learning Classifier With Deep Learning;" 2017 IEEE International Symposium on Technologies for Homeland Security (THS), pp. 1-5, Waltham, MA, USA, Apr. 25-26, 2017. IEEE. doi:10.1109/THS.2017.7943475.

Tramèr, Florian, et al.; "Stealing Machine Learning Models Via Prediction APIs;" 25th USENIX Security Symposium, pp. 601-618, Austin, TX, USA, Aug. 10-12, 2016. Usenix Association. URL https://www.usenix.org/conference/usenixsecurity16/technical-sessions/presentation/tramer.

U.S. Appl. No. 16/168,868; Inventor Fariborz Assaderaghi, et al.; "Method for Preventing the Extraction of a Machine Learning Model;" filed Oct. 24, 2018.

* cited by examiner

METHOD FOR HARDENING A MACHINE LEARNING MODEL AGAINST EXTRACTION

BACKGROUND

Field

This disclosure relates generally to machine learning, and more particularly, to a method for hardening a machine learning model against extraction.

Related Art

Machine learning is becoming more widely used in many of today's applications, such as applications involving forecasting and classification. Generally, a machine learning model is trained, at least partly, before it is used. Training data is used for training a machine learning model. Machine learning models may be classified by how they are trained. Supervised learning, unsupervised learning, semi-supervised learning, and reinforcement learning are examples of training techniques. The effectiveness of the machine learning model is influenced by its accuracy, execution time, storage requirements, and the quality of the training data. The expertise, time, and expense required for compiling a representative training set of data, labelling the data results in the training data, and the machine learning model obtained from the training data are valuable assets.

Protecting a machine learning model from attacks has become a problem. When machine learning is provided as a service, a user only has access to the inputs and outputs of the model. Model extraction is an attack that results in a near identical copy of the machine learning model being produced. To extract the model when the machine learning model is provided as a service, valid queries are provided to the model and the resulting output is compiled. Even when an attacker is just given access to the inputs and outputs, the machine learning model can be relatively easily copied. Once an attacker has copied the model, it can be illegitimately used and monetized. Also, an adversary can apply model extraction to gain white-box access and thereby develop other attacks, such as attacks that can fool the original model to mis-predict.

Therefore, a need exists for a way to harden a machine learning model against extraction.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
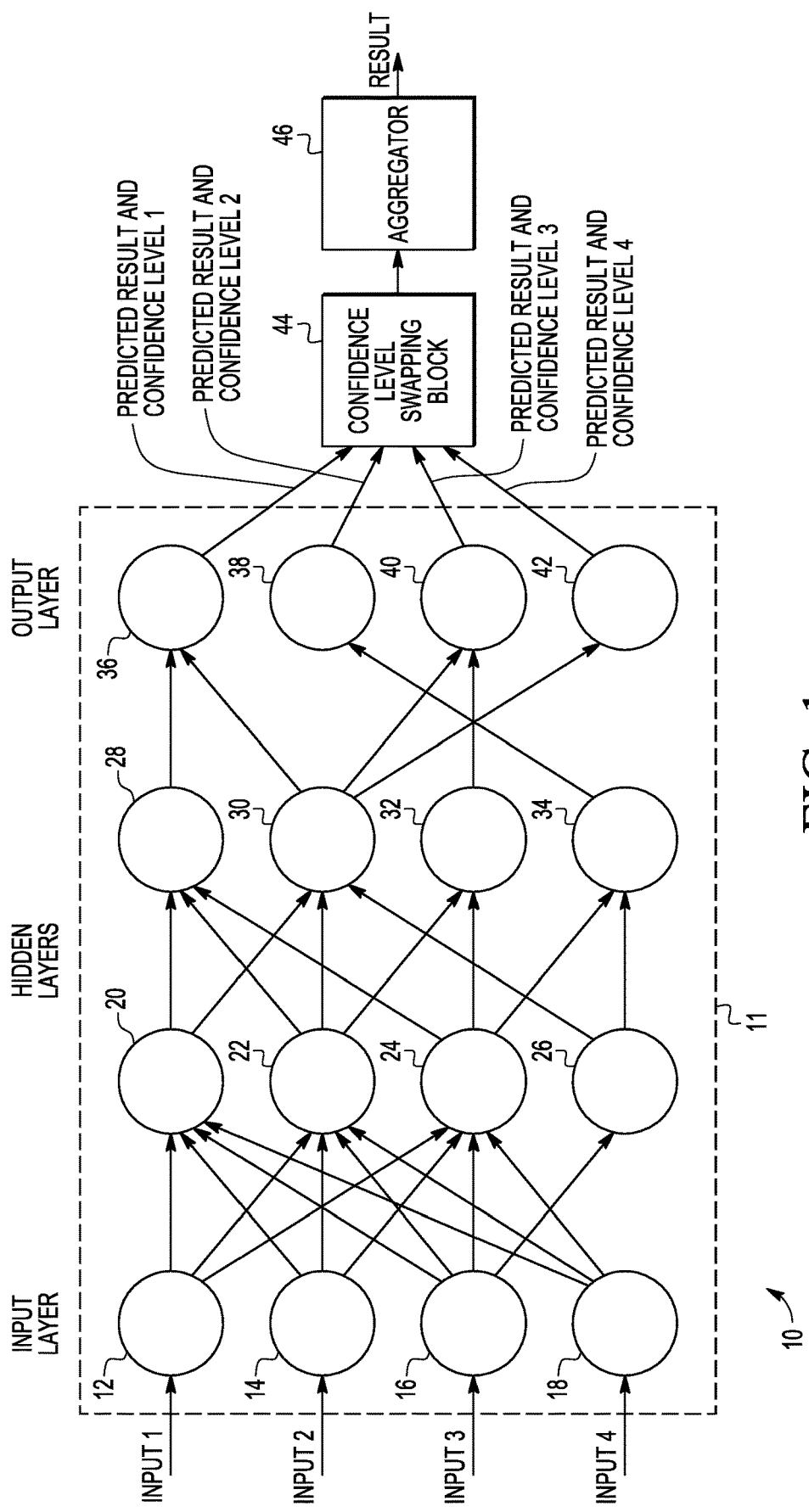
FIG. 1 illustrates a machine learning model in accordance with an embodiment.

Generally, there is provided, a method for hardening a machine learning model against extraction. Some machine learning models will provide a confidence level with an outputted prediction result. The confidence level is a measure of the likelihood that a prediction is correct. The confidence level may aid an attacker in extracting the machine learning model. In one embodiment, the method includes randomly swapping a confidence level of prediction results when an input sample is determined to be an attempted attack by an attacker. In one embodiment, if the input sample is determined to be an attempted attack, a first prediction result having the highest confidence level is swapped with the second prediction result having a lower confidence level. The second prediction result is then output along with the highest confidence level. There are various ways to detect an attempted attack. In one embodiment, a distribution of the outputted confidence levels of a plurality of normal input samples is compared with a distribution of potentially adversarial input data samples. A normal-type of input sample may be an input sample that might be input by a legitimate user making use of the machine learning model in a way the model was intended to be used. A potentially adversarial type of input sample may be from, for example, samples that may be randomly chosen or unrelated to the intended use of the machine learning model. It is then determined in which of the two distributions an input sample falls to detect the attempted attack. Swapping confidence levels so that an attacker does not receive correct prediction results makes it more difficult for an attacker to duplicate the prediction results, and therefore extract the machine learning model.

In accordance with an embodiment, there is provided, a method including: providing a trained machine learning model; in response to a query of the trained machine learning model, generating a confidence level corresponding to each prediction result, wherein the confidence level is a measure of confidence in an accuracy of a corresponding prediction result; determining that a query input to the trained machine learning model is an attack on the model, and in response, swapping a first confidence level corresponding to a first prediction result with a second confidence level corresponding to a second prediction result to produce swapped prediction results, wherein the first confidence level corresponding to the first prediction result is different than the second confidence level corresponding to the second prediction result; and outputting one of the second prediction result with the first confidence level or the first prediction result with the second confidence level. Determining that a query input to the trained machine learning model is an attack on the model may further include: comparing a distribution of predicted results for a plurality of normal input data samples with a distribution of predicted results for a plurality of adversarial input data samples; and establishing a threshold confidence level based on the comparison to determine if a query input to the trained machine learning model is a real query or an attempted attack. The swapping may be performed pseudo-randomly. The trained machine learning model may receive a private key for generating randomness for the swapped prediction results. The trained machine learning model may include a neural network. The first confidence level may be a highest confidence level of a plurality of confidence levels and the second confidence level may be a second highest confidence level of the plurality of confidence levels. The first confidence level may be a highest confidence level of a plurality of confidence levels and the second confidence level may be a third highest confidence level of the plurality of confidence levels. Swapping the first confidence level corresponding to the first prediction result with the second confidence level corresponding to the second prediction result may further include performing the swapping only if a difference between the first confidence level and the second confidence level is greater than a predetermined threshold value. Swapping the first confidence level corresponding to the first prediction result with the second confidence level corresponding to the second prediction result may further include performing the swapping only if a randomly generated number is greater than a predetermined threshold value.

In another embodiment, there is provided, a method for hardening a machine learning model against extraction, the method including: providing a trained machine learning model, the machine learning model for receiving an input sample, and in response, computing a plurality of intermediate prediction results and corresponding confidence levels, the confidence levels providing a measure of accuracy of the prediction results; determining if the input sample provided to the trained machine learning model is a normal input sample or if the input sample is provided by an attacker as an attempted attack on the trained machine learning model; if the input sample is determined to be a normal input sample, outputting the intermediate prediction result having the highest confidence level of the plurality of prediction results; if the input sample is determined to be the attempted attack, swapping the confidence level of a first intermediate prediction result having a highest corresponding confidence level with a relatively lower confidence level of a second intermediate prediction result; and outputting the second intermediate prediction result. Determining if the input sample provided to the trained machine learning model is a normal input sample or if the input sample is provided by an attacker as an attempted attack on the trained machine learning model may further include: comparing a distribution of predicted confidence levels for a plurality of normal input data samples with a distribution of predicted confidence levels for a plurality of adversarial input data samples; and establishing a threshold confidence level based on the comparison to determine if a query input to the trained machine learning model is a real query or an attempted attack. The trained machine learning model may receive a private key for generating randomness for the swapped prediction results. The trained machine learning model may include a neutral network. The relatively lower confidence level may be a second highest confidence level. Swapping the confidence level of a first intermediate prediction result having a highest corresponding confidence level with a confidence level of a second intermediate prediction result having a relatively lower confidence level may further include performing the swapping only if a difference between the highest confidence level and the relatively lower confidence level is greater than a predetermined threshold value. Swapping the confidence level of a first intermediate prediction result having a highest corresponding confidence level with a confidence level of a second intermediate prediction result having a relatively lower confidence level may further include performing the swapping only if a randomly generated number is greater than a predetermined threshold value.

In yet another embodiment, there is provided, a non-transitory machine-readable storage medium encoded with instructions for hardening a machine learning model against extraction, including: instructions for providing a trained machine learning model, the machine learning model for receiving an input sample, and in response, calculating a plurality of intermediate prediction results and corresponding confidence levels, the confidence levels providing a measure of accuracy of the prediction results; instructions for determining if the input sample provided to the trained machine learning model is a normal input sample or if the input sample is provided by an attacker as an attempted attack on the trained machine learning model; instructions for outputting the intermediate prediction result having the highest confidence level of the plurality of prediction results if the input sample is determined to be a normal input sample; instructions for swapping the confidence level of a first intermediate prediction result having a highest corresponding confidence level with a confidence level of a second intermediate prediction result having a relatively lower confidence level if the input sample is determined to be the attempted attack; and instructions for outputting the second intermediate prediction result with the highest confidence level. The trained machine learning model may include a neutral network. The instructions for swapping the confidence level of a first intermediate prediction result having a highest corresponding confidence level with a confidence level of a second intermediate prediction result having a relatively lower confidence level may further include instructions for performing the swapping only if a difference between the highest confidence level and the relatively lower confidence level is greater than a predetermined threshold value. The instructions for swapping the confidence level of a first intermediate prediction result having a highest corresponding confidence level with a confidence level of a second intermediate prediction result having a relatively lower confidence level may further include instructions for performing the swapping only if a randomly generated number is greater than a predetermined threshold value.

FIG. 1 illustrates machine learning model 10 in accordance with an embodiment. Machine learning model 10 includes machine learning algorithm 11, confidence level swapping block 44, and aggregator 46. As illustrated in FIG. 1, machine learning algorithm 11 is a neural network type of machine learning algorithm for providing a prediction in response to an input sample. Machine learning algorithm 11 may be a classification type algorithm. In other embodiments, machine learning algorithm 11 may be a different machine learning algorithm such as, for example, a decision tree algorithm. Generally, a neural network includes an input layer, output layer, and between the input and output layers are one or more hidden layers. Each of the layers includes one or more neurons, or nodes. As an example, the input layer (INPUT LAYER) of neural network 11 includes nodes 12, 14, 16, and 18, each receiving an input sample (INPUT 1, INPUT 2, INPUT 3, and INPUT 4). The hidden layers (HIDDEN LAYERS) include nodes 20, 22, 24, 26, 28, 30, 32, and 34. The output layer (OUTPUT LAYER) includes nodes 36, 38, 40, and 42. Intermediate prediction results are output from the output layer nodes. Each of the intermediate prediction results has a corresponding confidence level. (FIG. 1 shows PREDICTED RESULT AND CONFIDENCE LEVEL 1 through PREDICTED RESULT AND CONFIDENCE LEVEL 4).

The confidence levels are sometimes included as additional information for providing a measure of the expected accuracy of the results. Typically, the confidence levels are provided as percentages. In a neural network, one or more output signals are computed based on a weighted sum of the inputs and the outputs from the input nodes. In FIG. 1, the nodes are connected by weighted arcs having arrows indicating forward propagation. However, back propagation is also possible. Activation functions are used in a neural network to add non-linearity to a machine learning model. There are various types of activation functions, and each node has an activation function. A neural network application is run on the neural network architecture with a training data set to generate a machine learning model such as machine learning model 10.

Training data is available from various sources. For example, the MNIST training dataset, is a subset of a larger database provided by the National Institute of Standards and Technology (NIST). The MNIST includes 70,000 black and white images of handwritten digits, each represented by a 28×28 pixel bounding box (viewed as an array of size 784), where each pixel is encoded by a byte representing the corresponding gray level (i.e., an integer in the range of 0 to 255. A valid sample can be represented by a vector with 28×28=784 features, where each feature is an integer in the range of 0 to 255.

After training with the training data set, the trained machine learning model can be used to make predictions about similar input samples. Training a machine learning model with a relatively good training data set to produce a quality trained machine learning model can be expensive. Because of the costs and expertise necessary to train a model, machine learning as a service (MLaaS) has become common. Machine learning as a service is generally part of a cloud-based computing service provided for a fee. In the case of MLaaS, users only have access to the input and output samples that are provided to and received from the machine learning model. Because a machine learning model can be extracted using only the inputs to the model and the resulting outputs, it has become necessary to harden the model against extraction.

To harden machine learning model 10 against extraction, machine learning model 10 includes a confidence level swapping block 44. Confidence level swapping block 44 is coupled to receive the intermediate prediction results from the output layer nodes 36, 38, 40, and 42. Confidence level swapping block 44 first determines if an input sample is a normal input sample provided by a legitimate user, or if the input sample is provided by an attacker as an attempt to extract the model. There are a variety of ways to determine if an input sample is an attempted attack. In one embodiment, a distribution of the outputted confidence levels of a plurality of normal input samples is compared with a distribution of the prediction results of potentially adversarial input data samples. One possible way to produce potentially adversarial samples is to generate input data samples at random. The resulting dataset should follow a different distribution than a distribution of normal input samples that can be used to detect adversarial samples to protect against. A threshold confidence level is then established based on the comparison. Using the threshold confidence level, it is then determined in which of the two distributions an input sample falls to detect the attempted attack. If the input sample is determined to be a normal sample provided by a legitimate user, then confidence level swapping block 44 will allow the normal prediction results to be provided to aggregator 46 without swapping the confidence levels. Aggregator 46 will provide one of the plurality of intermediate prediction results based on a predetermined algorithm, e.g., the intermediate prediction result with the highest confidence level. However, if the input sample is determined to be provided by an attacker, then the prediction result having the highest confidence level is swapped with a prediction result having a relatively lower confidence level. In one embodiment, to add more uncertainty to the swapped prediction results in the event of an attempted attack, the prediction results may only be swapped if a randomly generated number is greater than a predetermined threshold value. The randomly generated number may be pseudo randomly generated. Also, the prediction results may be swapped only if a difference between the confidence levels to be swapped is greater than a predetermined threshold value.

There are various ways of swapping the prediction results and confidence levels. As one example, the prediction result with the highest confidence level swaps, or re-pairs, with a confidence level with the prediction result having the next lower confidence level. Then the prediction result that formerly had the next lower confidence level is output as a final prediction result but with the highest confidence level. As another example, the prediction result with the highest confidence level may swap confidence levels with the prediction result having the third highest confidence level. Then the prediction result that formerly had the third lowest confidence level is output as a final prediction result but with the highest confidence level. It is possible that an attacker may know that the prediction results are being swapped. To prevent the attacker from using that information, the machine learning model may receive a private secret key as an additional input to hash with the swapped prediction results and confidence levels. In one embodiment the secret private key may be used to generate a pseudo-randomness that will be used to output the prediction results. For example, a pseudo-random string may be generated with a keyed hash function using the input data sample and the private key as inputs. This pseudo-random string is then used as a seed for a pseudo-random number generator. This ensures that the same results will be consistently provided in response to the same inputs.

Figure 2:
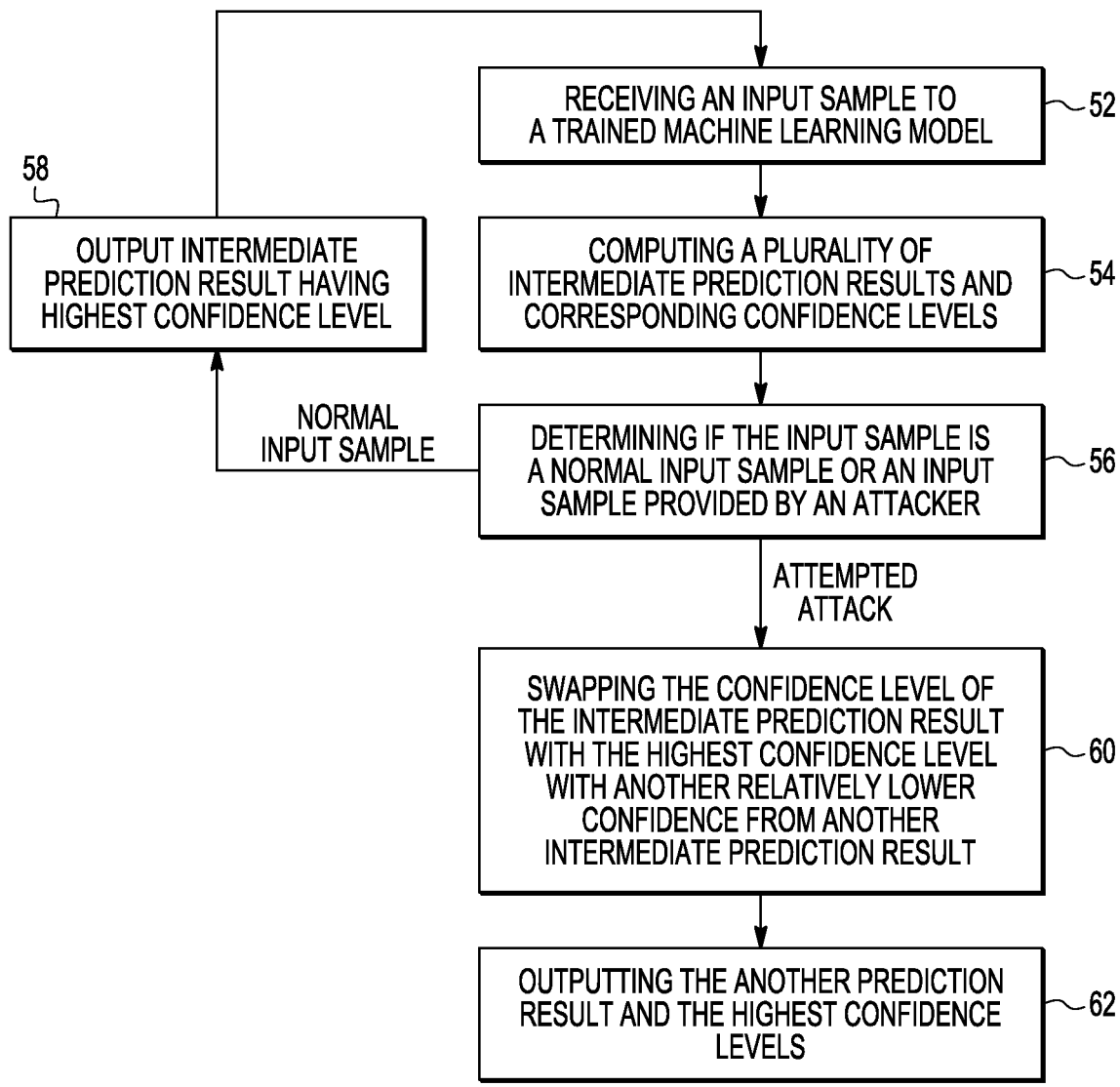
FIG. 2 illustrates a method for hardening a machine learning model against extraction in accordance with an embodiment.

FIG. 2 illustrates method 50 for hardening a machine learning model against extraction in accordance with an embodiment. Method 50 begins at step 52. At step 52, a query to the machine learning model, in the form of an input sample, is received at an input of a trained machine learning model such as machine learning model 10. At step 54, a plurality of intermediate prediction results and corresponding confidence levels is computed by the machine learning model. As illustrated in FIG. 1, the intermediate prediction results are provided to a plurality of inputs of confidence level swapping block 44. The next step is step 56, which is a decision step having two possible output paths based on the determination made at step 56. At step 56, it is determined if the input sample is a normal input sample, provided by a legitimate user of the model, or if the input sample is provided by an attacker in an attempted extraction of the machine learning model. There are various ways to make the determination of step 56, as discussed above in the discussion of FIG. 1. One way is to establish a threshold confidence level as discussed above. If the confidence level of an intermediate prediction result is above the threshold confidence level, then the input sample is determined to be a normal input sample input by a legitimate user. In this case, the path labeled "NORMAL INPUT SAMPLE" is taken from step 56 to step 58. At step 58, the intermediate prediction result having the highest confidence level is output. In another embodiment, another intermediate prediction result may also be output with the prediction result having the highest confidence level. From step 58, method 50 returns to step 52, where another input sample may be received by machine learning model 10 and the steps 52, 54, and 56 are repeated. However, if the confidence level of an intermediate prediction result is below the threshold, then the input sample may be a potential attempted attack on the model. The path labeled "ATTEMPTED ATTACK" is taken from step 56 to step 60. At step 60, the confidence level of the intermediate prediction result with the highest confidence level is swapped with another relatively lower confidence level from another intermediate prediction result. At step 62, the swapped prediction result and the highest confidence level are output from machine learning model 10.

Swapping the confidence levels as taught above and outputting the prediction results with the swapped confidence levels, makes it more difficult for an attacker to extract a machine learning model.

Figure 3:
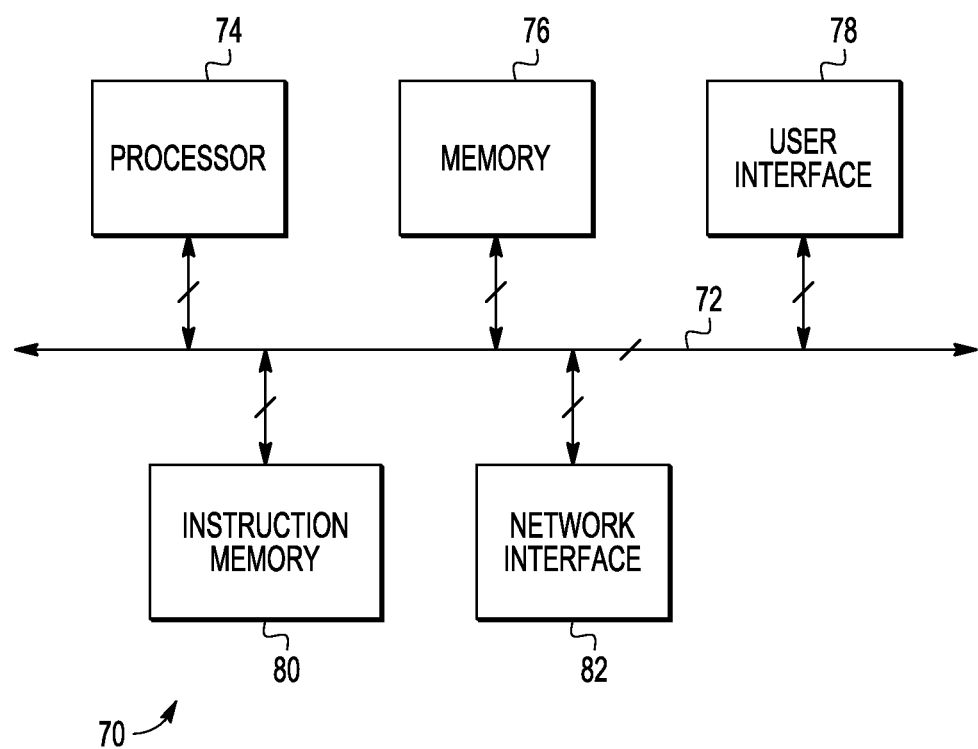
FIG. 3 illustrates a data processing system useful for implementing the machine learning model of FIG. 1.

FIG. 3 illustrates data processing system 70 useful for implementing the machine learning model of FIG. 1. Data processing system 70 may be implemented on one or more integrated circuits and may be used in an implementation of the machine learning systems in accordance with the described embodiments. Data processing system 70 includes bus 72. Connected to bus 72 is processor 74, memory 76, user interface 78, instruction memory 80, and network interface 82. Processor 74 may be any hardware device capable of executing instructions stored in memory 76 or instruction memory 80. For example, processor 74 may execute the machine learning algorithms using training data stored in memory 76. Processor 74 may have multiple processing cores. Processor 74 may be, for example, a microprocessor, field programmable gate array (FPGA), application-specific integrated circuit (ASIC), or similar device. Processor 74 may be implemented in a secure hardware element and may be tamper resistant.

Memory 76 may be any kind of memory, such as for example, L1, L2, or L3 cache or system memory. Memory 76 may include volatile memory such as static random-access memory (SRAM) or dynamic RAM (DRAM), or may include non-volatile memory such as flash memory, read only memory (ROM), or other volatile or non-volatile memory. Also, memory 76 may be implemented in a secure hardware element. Alternately, memory 66 may be a hard drive implemented externally to data processing system 70. In one embodiment, memory 76 is used to store the training data.

User interface 78 may be connected to one or more devices for enabling communication with a user such as an administrator. For example, user interface 78 may be enabled for coupling to a display, a mouse, a keyboard, or other input/output device. Network interface 82 may include one or more devices for enabling communication with other hardware devices. For example, network interface 82 may include, or be coupled to, a network interface card (NIC) configured to communicate according to the Ethernet protocol. Also, network interface 82 may implement a TCP/IP stack for communication according to the TCP/IP protocols. Various other hardware or configurations for communicating are available.

Instruction memory 80 may include one or more machine-readable storage media for storing instructions for execution by processor 74. In other embodiments, both memories 76 and 80 may also store data upon which processor 64 may operate. Memories 76 and 80 may store, for example, one or more machine learning models, training data, or encryption, decryption, and verification applications. Memory 80 may be implemented in a secure hardware element and be tamper resistant.

Providing an attacker with a less correct prediction result makes it more difficult, and therefore less likely that an attacker will be able to accurately duplicate the machine learning model.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
providing a trained machine learning model;
in response to a query of the trained machine learning model, generating a confidence level corresponding to each prediction result, wherein the confidence level is a measure of confidence in an accuracy of a corresponding prediction result;
determining that a query input to the trained machine learning model is an attack on the model, and in response, swapping a first confidence level corresponding to a first prediction result with a second confidence level corresponding to a second prediction result to produce swapped prediction results, wherein the first confidence level corresponding to the first prediction result is different than the second confidence level corresponding to the second prediction result, and wherein the swapping is performed only if a randomly generated number is greater than a predetermined threshold value; and
outputting one of the second prediction result with the first confidence level or the first prediction result with the second confidence level.

2. The method of claim 1, wherein determining that a query input to the trained machine learning model is an attack on the model further comprises:
comparing a distribution of predicted results for a plurality of normal input data samples with a distribution of predicted results for a plurality of adversarial input data samples; and establishing a threshold confidence level based on the comparison to determine if a query input to the trained machine learning model is a real query or an attempted attack.

3. The method of claim 1, wherein the swapping is performed pseudo-randomly.

4. The method of claim 1, wherein the trained machine learning model receives a private key for generating randomness for the swapped prediction results.

5. The method of claim 1, wherein the trained machine learning model includes a neural network.

6. The method of claim 1, wherein the first confidence level is a highest confidence level of a plurality of confidence levels and the second confidence level is a second highest confidence level of the plurality of confidence levels.

7. The method of claim 1, wherein the first confidence level is a highest confidence level of a plurality of confidence levels and the second confidence level is a third highest confidence level of the plurality of confidence levels.

8. The method of claim 1, wherein swapping the first confidence level corresponding to the first prediction result with the second confidence level corresponding to the second prediction result further comprising performing the swapping only if a difference between the first confidence level and the second confidence level is greater than a predetermined threshold value.

9. A method for hardening a machine learning model against extraction, the method comprising:
providing a trained machine learning model, the machine learning model for receiving an input sample, and in response, computing a plurality of intermediate prediction results and corresponding confidence levels, the confidence levels providing a measure of accuracy of the prediction results;
determining if the input sample provided to the trained machine learning model is a normal input sample or if the input sample is provided by an attacker as an attempted attack on the trained machine learning model;
if the input sample is determined to be a normal input sample, outputting the intermediate prediction result having the highest confidence level of the plurality of prediction results;
if the input sample is determined to be the attempted attack, swapping the confidence level of a first intermediate prediction result having a highest corresponding confidence level with a relatively lower confidence level of a second intermediate prediction result only if a randomly generated number is greater than a predetermined threshold value; and
outputting the second intermediate prediction result.

10. The method of claim 9, wherein determining if the input sample provided to the trained machine learning model is a normal input sample or if the input sample is provided by an attacker as an attempted attack on the trained machine learning model further comprises:
comparing a distribution of predicted confidence levels for a plurality of normal input data samples with a distribution of predicted confidence levels for a plurality of adversarial input data samples; and
establishing a threshold confidence level based on the comparison to determine if a query input to the trained machine learning model is a real query or an attempted attack.

11. The method of claim 9, wherein the trained machine learning model receives a private key for generating randomness for the swapped prediction results.

12. The method of claim 9, wherein the trained machine learning model comprises a neutral network.

13. The method of claim 9, wherein the relatively lower confidence level is a second highest confidence level.

14. The method of claim 9, wherein swapping the confidence level of a first intermediate prediction result having a highest corresponding confidence level with a confidence level of a second intermediate prediction result having a relatively lower confidence level further comprising performing the swapping only if a difference between the highest confidence level and the relatively lower confidence level is greater than a predetermined threshold value.

15. A non-transitory machine-readable storage medium encoded with instructions for hardening a machine learning model against extraction, comprising:
instructions for providing a trained machine learning model, the machine learning model for receiving an input sample, and in response, calculating a plurality of intermediate prediction results and corresponding confidence levels, the confidence levels providing a measure of accuracy of the prediction results;
instructions for determining if the input sample provided to the trained machine learning model is a normal input sample or if the input sample is provided by an attacker as an attempted attack on the trained machine learning model;
instructions for outputting the intermediate prediction result having the highest confidence level of the plurality of prediction results if the input sample is determined to be a normal input sample;
instructions for swapping the confidence level of a first intermediate prediction result having a highest corresponding confidence level with a confidence level of a second intermediate prediction result having a relatively lower confidence level if the input sample is determined to be the attempted attack and only if a randomly generated number is greater than a predetermined threshold value; and
instructions for outputting the second intermediate prediction result with the highest confidence level.

16. The non-transitory machine-readable storage medium of claim 15, wherein the trained machine learning model comprises a neutral network.

17. The non-transitory machine-readable storage medium of claim 15, wherein the instructions for swapping the confidence level of a first intermediate prediction result having a highest corresponding confidence level with a confidence level of a second intermediate prediction result having a relatively lower confidence level further comprises instructions for performing the swapping only if a difference between the highest confidence level and the relatively lower confidence level is greater than a predetermined threshold value.

* * * * *